United States Patent
Tokimune et al.

(10) Patent No.: US 9,890,272 B2
(45) Date of Patent: Feb. 13, 2018

(54) RUBBER COMPOSITION FOR TIRES, AND PNEUMATIC TIRE

(71) Applicant: SUMITOMO RUBBER INDUSTRIES, LTD., Kobe-shi, Hyogo (JP)

(72) Inventors: Ryuichi Tokimune, Kobe (JP); Tatsuya Miyazaki, Kobe (JP); Masanobu Nakamura, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 14/894,248

(22) PCT Filed: May 19, 2014

(86) PCT No.: PCT/JP2014/063169
§ 371 (c)(1),
(2) Date: Nov. 25, 2015

(87) PCT Pub. No.: WO2014/203666
PCT Pub. Date: Dec. 24, 2014

(65) Prior Publication Data
US 2016/0108214 A1    Apr. 21, 2016

(30) Foreign Application Priority Data
Jun. 18, 2013   (JP) ................... 2013-127755

(51) Int. Cl.
C08L 71/02      (2006.01)
C08L 9/06       (2006.01)
B60C 1/00       (2006.01)

(52) U.S. Cl.
CPC .............. C08L 9/06 (2013.01); B60C 1/0016 (2013.01); C08L 71/02 (2013.01); C08L 2207/324 (2013.01)

(58) Field of Classification Search
CPC ................................ C08L 71/02; C08L 9/06
See application file for complete search history.

(56) References Cited

U.S. PATENT DOCUMENTS 6,075,092 A    6/2000 Nakamura et al.
6,598,632 B1   7/2003 Moreland et al.
2001/0051677 A1   12/2001 Bataille et al.
2007/0141143 A1*  6/2007 Smithey .............. A61K 9/1635
                                            424/464
2013/0102714 A1   4/2013 Recker et al.
2013/0184387 A1   7/2013 Tahara et al.
2014/0100321 A1*  4/2014 Maejima ................ C08C 19/34
                                            524/506

FOREIGN PATENT DOCUMENTS

| CN | 103097449 A | 5/2013 | |
|---|---|---|---|
| JP | 5-194790 A | 8/1993 | |
| JP | 2001-200105 A | 7/2001 | |
| JP | 2003-504478 A | 2/2003 | |
| JP | 2005-502753 A | 1/2005 | |
| JP | 2006-213864 A | 8/2006 | |
| JP | 2007-269964 A | 10/2007 | |
| JP | 2012-172082 A | 9/2012 | |
| JP | 2013-10967 A | 1/2013 | |
| WO | WO 97/39055 A1 | 10/1997 | |
| WO | WO 03/022914 A1 | 3/2003 | |
| WO | WO 2012004054 A1 * | 1/2012 | ............... C08K 3/04 |

OTHER PUBLICATIONS

Machine translation of WO 2012/004054 A1, Jan. 2012.*
International Search Report, issued in PCT/JP2014/063169, dated Jul. 8, 2014.
Machine translation of JP-2006-213864-A dated Aug. 17, 2006.
Machine translation of JP-2007-269964-A dated Oct. 18, 2007.
Machine translation of JP-2012-172082-A dated Sep. 10, 2012.

* cited by examiner

Primary Examiner — Vickey Nerangis
(74) Attorney, Agent, or Firm — Birch, Stewart, Kolasch & Birch, LLP

(57) ABSTRACT

The present invention provides a rubber composition for tires and a pneumatic tire formed from the rubber composition, wherein the rubber composition can improve discoloration resistance and tire appearance while maintaining or improving good fuel economy and good abrasion resistance. The present invention relates to a rubber composition for tires containing a rubber component containing styrene-butadiene rubber in an amount of 30 to 100% by mass based on 100% by mass of the rubber component; a Pluronic-type nonionic surfactant; and sulfur, the rubber composition for tires having a combined amount of carbon black and silica of 20 to 140 parts by mass relative to 100 parts by mass of the rubber component.

6 Claims, No Drawings

RUBBER COMPOSITION FOR TIRES, AND PNEUMATIC TIRE

TECHNICAL FIELD

The present invention relates to a rubber composition for tires and a pneumatic tire formed from the rubber composition.

BACKGROUND ART

Automobile tires are formed from rubber compositions containing natural rubber and/or synthetic diene rubbers as raw materials. Such tires are degraded in the presence of ozone and may eventually be cracked. In order to suppress crack formation and growth in the presence of ozone, rubber compositions contain, for example, additives, including antioxidants, such as N-(1,3-dimethylbutyl)-N'-phenyl-p-phenylenediamine (6PPD) or poly(2,2,4-trimethyl-1,2-)dihydroquinoline (TMDQ), and petroleum wax.

The antioxidants and petroleum wax in vulcanized rubber migrate (bloom) to the surface of rubber such as tires, thereby protecting the rubber from ozone. Unfortunately, excessive blooming of the antioxidants and petroleum wax in a short period of time causes white discoloration. Also, the antioxidants degraded by ozone cause brown discoloration, and similar excessive blooming of them intensifies brown discoloration. In addition, if wax and the like bloomed on the tire surface form irregularities, diffused reflection of light occurs, making the brown discoloration caused by the degraded antioxidants more noticeable. Thus, the shine of the tires is also lost.

Patent Literature 1 discloses the addition of a polyoxyethylene ether nonionic surfactant for preventing deterioration of tire appearance. Yet, this technique needs improvement in terms of improving discoloration resistance and tire appearance while maintaining or improving good fuel economy and good abrasion resistance.

CITATION LIST

Patent Literature

Patent Literature 1: JP-A H05-194790

SUMMARY OF INVENTION

Technical Problem

The present invention aims to solve the above problems and provide a rubber composition for tires and a pneumatic tire formed from the rubber composition, wherein the rubber composition can improve discoloration resistance and tire appearance while maintaining or improving good fuel economy and good abrasion resistance.

Solution to Problem

The present invention relates to a rubber composition for tires, containing a rubber component containing styrene-butadiene rubber in an amount of 30 to 100% by mass based on 100% by mass of the rubber component; a Pluronic-type nonionic surfactant; and sulfur, the rubber composition for tires having a combined amount of carbon black and silica of 20 to 140 parts by mass relative to 100 parts by mass of the rubber component.

Preferably, the rubber composition for tires contains 0.1 to 5.0 parts by mass of the Pluronic-type nonionic surfactant relative to 100 parts by mass of the rubber component.

Preferably, the rubber composition for tires contains 0.1 to 6.0 parts by mass of the sulfur relative to 100 parts by mass of the rubber component.

Preferably, the rubber composition for tires is used as a rubber composition for treads.

The present invention also relates to a pneumatic tire, including a tire component formed from the rubber composition.

Preferably, the tire component is a tread.

Advantageous Effects of Invention

The rubber composition for tires of the present invention contains a rubber component containing styrene-butadiene rubber in an amount of 30 to 100% by mass based on 100% by mass of the rubber component; a Pluronic-type nonionic surfactant; and sulfur, and has a combined amount of carbon black and silica of 20 to 140 parts by mass relative to 100 parts by mass of the rubber component. Thus, the rubber composition can improve discoloration resistance and tire appearance while maintaining or improving good fuel economy and good abrasion resistance. Accordingly, the present invention can provide a pneumatic tire excellent in fuel economy, abrasion resistance, discoloration resistance, and tire appearance.

DESCRIPTION OF EMBODIMENTS

The rubber composition for tires of the present invention contains a rubber component containing styrene-butadiene rubber in an amount of 30 to 100% by mass based on 100% by mass of the rubber component; a Pluronic-type nonionic surfactant; and sulfur, and has a combined amount of carbon black and silica of 20 to 140 parts by mass relative to 100 parts by mass of the rubber component.

In the present invention, since a specific nonionic surfactant is added to a rubber composition containing a specific rubber component, a specific amount of filler (carbon black and/or silica), and sulfur, the irregularities (bloom layer) formed on the tire surface due to blooming of wax and the like are smoothened so that diffused reflection of light can be suppressed. This also reduces the brown discoloration and the white discoloration described above, thus improving discoloration resistance. Further, this also imparts, for example, adequate black appearance and shine to the tire surface, thus improving tire appearance. At the same time, this makes it possible to maintain good fuel economy or good abrasion resistance and improve these performances.

In addition, the rubber composition can improve tire appearance while maintaining or improving fuel economy and abrasion resistance as described above, presumably because the presence of the specific nonionic surfactant properly controls the compatibility between the rubber composition and the specific nonionic surfactant.

The use of a specific amount of styrene-butadiene rubber (SBR) in the rubber composition of the present invention achieves good fuel economy and good abrasion resistance, and enables suitable control of blooming of the nonionic surfactant, with the result that the effects of the present invention can be well achieved.

Specifically, the SBR content based on 100% by mass of the rubber component is 30% by mass or more, preferably 40% by mass or more, more preferably 50% by mass or more. It may be 100% by mass. In the case where another rubber component is used together, the SBR content is preferably 90% by mass or less. If the SBR content is less than 30% by mass, fuel economy and abrasion resistance will be insufficient.

Any SBR commonly used in the tire industry, such as emulsion-polymerized styrene-butadiene rubber (E-SBR) and solution-polymerized styrene-butadiene rubber (S-SBR), can be suitably selected according to the service conditions, intended purpose, or the like. These may be used alone or in combination of two or more thereof. Examples thereof include SL series available from JSR Corporation, Tufdene series available from Asahi Kasei Chemicals Corporation, Asaprene E15 available from Asahi Kasei Chemicals Corporation, and Nipol series available from Zeon Corporation.

The styrene content in SBR is preferably 5% by mass or more, more preferably 10% by mass or more, still more preferably 15% by mass or more. The styrene content is preferably 60% by mass or less, more preferably 50% by mass or less, still more preferably 40% by mass or less, particularly preferably 30% by mass or less. With a styrene content in the above range, the effects of the present invention can be more suitably achieved.

In the present invention, the styrene content in SBR can be calculated by $H^1$-NMR measurement.

In the present invention, at least one rubber selected from the group consisting of polybutadiene rubber (BR), natural rubber (NR), and polyisoprene rubber (IR) may be used with SBR. These may be used alone or in combination of two or more thereof. In particular, NR or BR is preferred, and a combination of BR with SBR is more preferred, because the effects of the present invention (especially, abrasion resistance) can be more suitably achieved.

Examples of NR include those commonly used in the tire industry, such as SIR20, RSS #3, and TSR20. These may be used alone or in combination of two or more thereof.

Any IR commonly used in the tire industry can be used, either alone or in combination of two or more thereof.

Any BR can be used. Examples thereof include BR having a high cis content such as BR730 and BR51 available from JSR Corporation, BR1220 available from Zeon Corporation, and BR130B, BR150B, and BR710 available from Ube Industries, Ltd. These may be used alone or in combination of two or more thereof. In particular, the cis content in BR is preferably 90% by mass or more because the effects of the present invention can be more suitably achieved.

In the case where the rubber composition contains BR, the BR content based on 100% by mass of the rubber component is preferably 15% by mass or more, more preferably 25% by mass or more. The BR content is preferably 55% by mass or less, more preferably 45% by mass or less. With a BR content in the above range, the effects of the present invention can be more suitably achieved.

In addition to SBR, BR, NR, and IR, any other rubber components may be used. Examples thereof include diene rubbers such as styrene-isoprene-butadiene rubber (SIBR), chloroprene rubber (CR), acrylonitrile-butadiene rubber (NBR), ethylene-propylene-diene rubber (EPDM), butyl rubber (IIR), and halogenated butyl rubber (X-IIR). These rubber components may be used alone or in combination of two or more thereof.

In the present invention, a Pluronic-type nonionic surfactant is used. The Pluronic-type nonionic surfactant is also referred to as a polyoxyethylene-polyoxypropylene glycol, a polyoxyethylene-polyoxypropylene block polymer, or a polypropylene glycol ethylene oxide adduct. Generally, it is a nonionic surfactant represented by the formula (I) below. As shown in the formula (I), the Pluronic-type nonionic surfactant contains on both sides thereof a hydrophilic group having an ethylene oxide structure, and also contains a hydrophobic group having a propylene oxide structure between the hydrophilic groups.

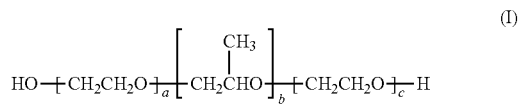

(I)

In the formula, a, b, and c represent integers.

The degree of polymerization of the polypropylene oxide block of the Pluronic-type nonionic surfactant ("b" in the formula (I)) and the number of polyethylene oxide units added ("a+c" in the formula (I)) are not particularly limited and can be suitably determined according to the service conditions, intended purpose, or the like. A surfactant with a higher proportion of the polypropylene oxide block tends to have higher affinity for rubber and thus to migrate to the rubber surface at a slower rate. In particular, the degree of polymerization of the polypropylene oxide block ("b" in the formula (I)) is preferably 100 or less, more preferably 10 to 70, still more preferably 10 to 60, particularly preferably 20 to 60, most preferably 20 to 45, in order to suitably control blooming of the nonionic surfactant and thereby achieve the effects of the present invention more suitably. Similarly, the number of polyethylene oxide units added (a+c in the formula (I)) is preferably 100 or less, more preferably 3 to 65, still more preferably 5 to 55, particularly preferably 5 to 40, most preferably 10 to 40. When the degree of polymerization of the polypropylene oxide block and the number of polyethylene oxide units added fall within the respective ranges described above, blooming of the nonionic surfactant can be suitably controlled, and the effects of the present invention can be more suitably achieved.

Examples of Pluronic-type nonionic surfactants include Pluronic series available from BASF Japan Ltd., NEWPOL PE series available from Sanyo Chemical Industries, Ltd., Adeka Pluronic L or F series available from Adeka Corporation, EPAN series available from Dai-ichi Kogyo Seiyaku Co., Ltd, and Pronon series or UNILUB available from NOF Corporation. These may be used alone or in combination of two or more thereof.

The Pluronic-type nonionic surfactant content relative to 100 parts by mass of the rubber component is preferably 0.1 parts by mass or more, more preferably 0.3 parts by mass or more, still more preferably 0.6 parts by mass or more. If the Pluronic-type nonionic surfactant content is less than 0.1 parts by mass, the effects of the present invention may be insufficient. At the same time, the Pluronic-type nonionic surfactant content is preferably 5.0 parts by mass or less, more preferably 4.0 parts by mass or less, still more preferably 3.0 parts by mass or less. The content of more than 5.0 parts by mass may cause deterioration in handling stability, crack resistance, ozone resistance, and discoloration resistance.

In the present invention, sulfur is used to adequately form crosslinks between polymer chains. With the use of sulfur, blooming of the nonionic surfactant can be suitably controlled, and the effects of the present invention can be well achieved. Examples of sulfur include those commonly used in the rubber industry, such as powder sulfur, precipitated sulfur, colloidal sulfur, insoluble sulfur, highly dispersible sulfur, and soluble sulfur. These may be used alone or in combination of two or more thereof.

The sulfur content relative to 100 parts by mass of the rubber component is preferably 0.1 parts by mass or more, more preferably 0.5 parts by mass or more, still more preferably 1.0 part by mass or more. If the sulfur content is less than 0.1 parts by mass, the effects of the present invention may be insufficient. The sulfur content is preferably 6.0 parts by mass or less, more preferably 5.0 parts by mass or less, still more preferably 4.0 parts by mass or less, particularly preferably 3.0 parts by mass or less, most preferably 2.5 parts by mass or less. The content of more than 6.0 parts by mass may cause deterioration in fuel economy and abrasion resistance.

In the present invention, in addition to sulfur, an alkylphenol-sulfur chloride condensate (for example, Tackirol V200 available from Taoka Chemical Co., Ltd.) may be used as a vulcanizing agent.

In the present invention, the combined amount of carbon black and silica is a specific amount. This results in good reinforcing properties, good fuel economy and good abrasion resistance. In addition, blooming of the nonionic surfactant can be suitably controlled, and the effects of the present invention can be well achieved.

Specifically, the combined amount of carbon black and silica relative to 100 parts by mass of the rubber component is 20 parts by mass or more, preferably 30 parts by mass or more, more preferably 40 parts by mass or more, still more preferably 55 parts by mass or more, particularly preferably 65 parts by mass or more. At the same time, the combined amount is 140 parts by mass or less, preferably 130 parts by mass or less, more preferably 105 parts by mass or less. The combined amount of less than 20 parts by mass tends to result in deteriorated reinforcing properties, while the combined amount of more than 140 parts by mass tends to cause deterioration in fuel economy and abrasion resistance.

In the present invention, either carbon black or silica may be used alone or both may be used together.

Examples of carbon black include, but not limited to, GPF, FEF, HAF, ISAF, and SAF. These may be used alone or in combination of two or more thereof.

The nitrogen adsorption specific surface area ($N_2SA$) of carbon black is preferably 20 $m^2/g$ or more, more preferably 50 $m^2/g$ or more. If the $N_2SA$ is less than 20 $m^2/g$, reinforcing properties may be insufficient. The $N_2SA$ is preferably 180 $m^2/g$ or less, more preferably 120 $m^2/g$ or less, still more preferably 90 $m^2/g$ or less, particularly preferably 80 $m^2/g$ or less. The carbon black having an $N_2SA$ of more than 180 $m^2/g$ cannot be easily dispersed and thus tends to result in deteriorated fuel economy and deteriorated abrasion resistance.

The $N_2SA$ of carbon black is determined in accordance with JIS K 6217-2:2001.

The dibutyl phthalate (DBP) oil absorption of carbon black is preferably 50 ml/100 g or more, and more preferably 80 ml/100 g or more. If the DBP oil absorption is less than 50 ml/100 g, reinforcing properties may be insufficient. At the same time, the DBP oil absorption of carbon black is preferably 200 ml/100 g or less, more preferably 135 ml/100 g or less, still more preferably 115 ml/100 g or less. The carbon black having a DBP oil absorption of more than 200 ml/100 g cannot be easily dispersed and thus tends to result in deteriorated fuel economy and deteriorated abrasion resistance.

The DBP oil absorption of carbon black is determined in accordance with JIS K6217-4:2001.

In the case where the rubber composition contains carbon black, the carbon black content relative to 100 parts by mass of the rubber component is preferably 2 parts by mass or more, more preferably 3 parts by mass or more. If the carbon black content is less than 2 parts by mass, reinforcing properties may be insufficient. The content is preferably 50 parts by mass or less, more preferably 30 parts by mass or less, still more preferably 20 parts by mass or less, particularly preferably 15 parts by mass or less. The carbon black content of more than 50 parts by mass tends to cause deterioration in fuel economy and abrasion resistance. The use of a large amount of carbon black may cause deterioration in fuel economy and abrasion resistance; however, in the present invention, the deterioration in fuel economy and abrasion resistance is suppressed by controlling the carbon black content to a specific range.

Any silica can be used. Examples thereof include dry silica (anhydrous silicic acid) and wet silica (hydrous silicic acid). These may be used alone or in combination of two or more thereof. In particular, wet silica is preferred because it has many silanol groups.

The nitrogen adsorption specific surface area ($N_2SA$) of silica is preferably 50 $m^2/g$ or more, more preferably 100 $m^2/g$ or more, still more preferably 150 $m^2/g$ or more. The silica having an $N_2SA$ of less than 50 $m^2/g$ tends to result in a decrease in fuel economy and abrasion resistance. The $N_2SA$ is preferably 250 $m^2/g$ or less, more preferably 210 $m^2/g$ or less. The silica having an $N_2SA$ of more than 250 $m^2/g$ cannot be easily dispersed and thus tends to result in deteriorated fuel economy and deteriorated abrasion resistance.

The $N_2SA$ of silica is a value determined by the BET method in accordance with ASTM D3037-93.

In the case where the rubber composition contains silica, the silica content relative to 100 parts by mass of the rubber component is preferably 10 parts by mass or more, more preferably 30 parts by mass or more, still more preferably 50 parts by mass or more, particularly preferably 60 parts by mass or more. At the same time, the silica content is preferably 140 parts by mass or less, more preferably 120 parts by mass or less, still more preferably 100 parts by mass or less. The silica content of more than 140 parts by mass tends to cause deterioration in fuel economy, abrasion resistance, discoloration resistance, and tire appearance. The silica content in the above range can result in a further improvement in tire appearance while providing reinforcement.

In the case where the rubber composition of the present invention contains silica, it is preferred that the rubber composition also contains a silane coupling agent.

Any silane coupling agent that has been used with silica in the tire industry can be used. Examples thereof include sulfide silane coupling agents such as bis(3-triethoxysilylpropyl)disulfide, mercapto silane coupling agents such as 3-mercaptopropyltrimethoxysilane, vinyl silane coupling agents such as vinyltriethoxysilane, amino silane coupling agents such as 3-aminopropyltriethoxysilane, glycidoxy silane coupling agents such as γ-glycidoxypropyltriethoxysilane, nitro silane coupling agents such as 3-nitropropyltrimethoxysilane, and chloro silane coupling agents such as 3-chloropropyltrimethoxysilane. These may be used alone or in combination of two or more thereof. In particular, sulfide silane coupling agents are preferred, and bis(3-triethoxysilylpropyl)disulfide is more preferred.

In the case where the rubber composition contains a silane coupling agent, the silane coupling agent content relative to 100 parts by mass of silica is preferably 2 parts by mass or more, more preferably 5 parts by mass or more. The silane coupling agent content of less than 2 parts by mass tends to result in reduced fuel economy and reduced abrasion resistance. At the same time, the silane coupling agent content is preferably 20 parts by mass or less, more preferably 15 parts by mass or less. If the silane coupling agent content is more than 20 parts by mass, the resulting effect tends not to be commensurate with an increased cost.

In the present invention, wax is preferably added in order to suppress crack formation and growth due to ozone. In the present invention, even when wax is added, the irregularities (bloom layer) formed on the tire surface due to blooming of wax and the like are smoothened so that diffused reflection of light can be suppressed, as described above. Therefore, the brown discoloration and white discoloration described above can be reduced. The wax also imparts, for example, adequate black appearance and shine to the tire surface, thus improving tire appearance. Further, the present invention enables to maintain or improve good fuel economy and good abrasion resistance, owing to the specific rubber composition.

Any wax can be used. Examples thereof include petroleum waxes, natural waxes, and synthetic waxes prepared by refining or chemically treating multiple types of waxes. These waxes may be used alone or in combination of two or more thereof.

Examples of petroleum waxes include paraffin wax and microcrystalline wax. Any natural wax may be used as long as it is derived from resources other than petroleum. Examples of natural waxes include plant waxes such as candelilla wax, carnauba wax, Japan wax, rice wax, and jojoba wax; animal waxes such as beeswax, lanolin, and spermaceti; mineral waxes such as ozokerite, ceresin, and petrolatum; and refined products of these waxes.

In the case where the rubber composition contains wax, the wax content relative to 100 parts by mass of the rubber component is preferably 0.5 parts by mass or more, more preferably 1.0 part by mass or more. If the wax content is less than 0.5 parts by mass, ozone resistance may be insufficient. At the same time, the wax content is preferably 12 parts by mass or less, more preferably 10 parts by mass or less, still more preferably 5.0 parts by mass or less. Once the wax content is more than 12 parts by mass, no further improvement in ozone resistance can be obtained, and the cost may increase.

The rubber composition of the present invention may contain oil. The addition of oil improves processability and imparts flexibility to the resulting tire, with the result that the effects of the present invention can be better achieved. Examples of the oil include process oils, vegetable oils and fats, and mixtures thereof. Examples of process oils include paraffinic process oils, aromatic process oils, and naphthenic process oils. Specific examples of paraffinic process oils include PW-32, PW-90, PW-150, and PS-32 available from Idemitsu Kosan Co., Ltd. Specific examples of aromatic process oils include AC-12, AC-460, AH-16, AH-24, and AH-58 available from Idemitsu Kosan Co., Ltd. Examples of vegetable oils and fats include castor oil, cottonseed oil, linseed oil, rapeseed oil, soybean oil, palm oil, coconut oil, peanut oil, rosin, pine oil, pine tar, tall oil, corn oil, rice bran oil, safflower oil, sesame oil, olive oil, sunflower oil, palm kernel oil, camellia oil, jojoba oil, macadamia nut oil, and tung oil. These may be used alone or in combination of two or more thereof. In particular, paraffinic process oil is preferred because then the effects of the present invention can be suitably achieved.

In the case where the rubber composition contains oil, the oil content relative to 100 parts by mass of the rubber component is preferably 1.0 part by mass or more, more preferably 5.0 parts by mass or more, still more preferably 10 parts by mass or more, particularly preferably 15 parts by mass or more. At the same time, the oil content is preferably 60 parts by mass or less, more preferably 40 parts by mass or less, still more preferably 30 parts by mass or less. Although oil also blooms to the tire surface, when the oil content is in the above range, blooming of the nonionic surfactant can be suitably controlled, and the effects of the present invention can be more suitably achieved. The oil content of more than 60 parts by mass tends to cause deterioration in fuel economy.

The rubber composition of the present invention preferably contains an antioxidant in order to suppress crack formation and growth due to ozone. In the present invention, although an antioxidant is added, it is possible, as described above, to reduce the brown discoloration and the white discoloration and to improve discoloration resistance and tire appearance while maintaining or improving good fuel economy and good abrasion resistance.

Any antioxidant can be used. Examples thereof include naphthylamine antioxidants, quinoline antioxidants, diphenylamine antioxidants, p-phenylenediamine antioxidants, hydroquinone derivatives, phenol antioxidants (monophenol, bisphenol, trisphenol, and polyphenol antioxidants), thiobisphenol antioxidants, benzimidazole antioxidants, thiourea antioxidants, phosphite antioxidants, and organic thioacid antioxidants. These may be used alone or in combination of two or more thereof. In particular, p-phenylenediamine antioxidants are preferred because they have good ozone resistance and therefore the effects of the present invention can be more suitably achieved.

Examples of p-phenylenediamine antioxidants include N-(1,3-dimethylbutyl)-N'-phenyl-p-phenylenediamine, N-isopropyl-N'-phenyl-p-phenylenediamine, N-1,4-dimethylpentyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-4-methyl-2-pentyl-N'-phenyl-p-phenylenediamine, N,N'-diaryl-p-phenylenediamine, hindered diaryl-p-phenylenediamine, phenylhexyl-p-phenylenediamine, and phenyloctyl-p-phenylenediamine. These may be used alone or in combination of two or more thereof. In particular, N-(1,3-dimethylbutyl)-N'-phenyl-p-phenylenediamine is more preferred because it has good ozone resistance and therefore the effects of the present invention can be more suitably achieved and also because it is excellent in economic performance.

In the case where the rubber composition contains an antioxidant, the antioxidant content relative to 100 parts by mass of the rubber component is preferably 0.3 parts by mass or more, more preferably 0.5 parts by mass or more, still more preferably 1.0 part by mass or more. If the antioxidant content is less than 0.3 parts by mass, ozone resistance may be insufficient. The antioxidant content is preferably 10 parts by mass or less, more preferably 6.0 parts by mass or less. If the antioxidant content is more than 10 parts by mass, the amount of blooms of the antioxidant may increase, deteriorating tire appearance.

Preferably, the rubber composition of the present invention contains a vulcanization accelerator. Examples of the vulcanization accelerator include sulfenamide, thiazole, thiuram, thiourea, guanidine, dithiocarbamate, aldehyde-amine or aldehyde-ammonia, imidazoline, and xanthate vulcanization accelerators. These vulcanization accelerators may be used alone or in combination of two or more thereof. In particular, sulfenamide vulcanization accelerators are preferred, and combinations of sulfenamide vulcanization accelerators with guanidine vulcanization accelerators are more preferred, because the effects of the present invention can be more suitably achieved.

Examples of sulfenamide vulcanization accelerators include N-tert-butyl-2-benzothiazolylsulfenamide (TBBS), N-cyclohexyl-2-benzothiazolylsulfenamide (CBS), and N,N-dicyclohexyl-2-benzothiazolylsulfenamide (DCBS). These may be used alone or in combination of two or more thereof. In particular, CBS is preferred, and a combination of CBS with 1,3-diphenylguanidine is more preferred, because the effects of the present invention can be more suitably achieved.

The rubber composition of the present invention may appropriately further contain a compounding agent which is commonly used for production of rubber compositions, such as zinc oxide, stearic acid, or a tackifier, in addition to the above-mentioned components.

The rubber composition of the present invention can be prepared by known methods, for example, by mixing the components using a rubber kneader such as an open roll mill or a Banbury mixer, and vulcanizing the mixture.

The rubber composition of the present invention can be suitably used in tire components and especially in treads and the like which form a surface (outer surface) of a tire and thus need to have good discoloration resistance and good tire appearance.

The pneumatic tire of the present invention can be formed from the rubber composition by usual methods.

Specifically, the rubber composition containing the components mentioned above, before vulcanization, is extruded and processed into the shape of a tire component such as a tread, and then formed together with other tire components in a usual manner in a tire building machine to build an unvulcanized tire. The unvulcanized tire is heated and pressurized in a vulcanizer to obtain a tire.

The pneumatic tire of the present invention is used for passenger vehicles, trucks or buses, and two-wheeled vehicles, or as a high performance tire. The term "high performance tire" as used herein refers to a tire particularly excellent in grip performance, and it is a concept that encompasses racing tires used on racing vehicles.

EXAMPLES

The present invention is specifically described with reference to, but not limited to, examples below.

The chemical agents used in the examples and comparative examples are described below.

SBR: Asaprene E15 available from Asahi Kasei Chemicals Corporation
NR: RSS #3
IR: IR2200 available from Zeon Corporation
BR: BR 730 (cis content: 95% by mass) available from JSR Corporation
Carbon black: SHOBLACK N330 ($N_2SA$: 75 $m^2/g$, DBP oil absorption: 102 ml/100 g) available from Cabot Corporation
Silica: ULTRASIL VN3 ($N_2SA$: 175 $m^2/g$) available from Evonik Degussa
Silane coupling agent: Si266 (bis(3-triethoxysilylpropyl) disulfide) available from Evonik Degussa
Wax: Ozoace wax available from Nippon Seiro Co., Ltd.
Oil: process oil PW-32 (paraffinic process oil) available from Idemitsu Kosan Co., Ltd.
Surfactant 1: NEWPOL PE-64 (Pluronic-type nonionic surfactant (PEG/PPG-25/30 copolymer) (in the formula (I), a+c: 25, and b: 30)) available from Sanyo Chemical Industries, Ltd.
Surfactant 2: NEWPOL PE-74 (Pluronic-type nonionic surfactant (PEG/PPG-30/35 copolymer) (in the formula (I), a+c: 30, and b: 35)) available from Sanyo Chemical Industries, Ltd.
Surfactant 3: polyoxyethylene sorbitan monostearate available from Kanto Chemical Co., Inc.
Surfactant 4: polyoxyethylene sorbitan trioleate available from Kanto Chemical Co., Inc.
Surfactant 5: polyoxyethylene dodecyl ether available from Kanto Chemical Co., Inc.
Surfactant 6: ethylene glycol dibutyl ether available from Tokyo Chemical Industry Co., Ltd.
Antioxidant: NOCRAC 6C (N-1,3-dimethylbutyl-N'-phenyl-p-phenylenediamine) available from Ouchi Shinko Chemical Industrial Co., Ltd.
Stearic acid: stearic acid available from NOF Corporation
Sulfur: powdered sulfur available from Tsurumi Chemical Industry Co., Ltd.
V200: Tackirol V200 (alkylphenol-sulfur chloride condensate) available from Taoka Chemical Co., Ltd.
Zinc oxide: zinc oxide #1 available from Mitsui Mining & Smelting Co., Ltd.
Vulcanization accelerator 1: Nocceler CZ (N-cyclohexyl-2-benzothiazolylsulfenamide) available from Ouchi Shinko Chemical Industrial Co., Ltd.
Vulcanization accelerator 2: Nocceler D (1,3-diphenylguanidine) available from Ouchi Shinko Chemical Industrial Co., Ltd.

According to the respective formulations shown in Tables 1 to 3, the chemicals other than the sulfur, V200, and the vulcanization accelerators were kneaded using a 1.7-L Banbury mixer until the temperature of the mixture reached 160° C. Next, the kneaded product was mixed with the sulfur, V200, and the vulcanization accelerators using an open roll mill until the temperature of the kneaded mixture reached 105° C. to prepare an unvulcanized rubber composition. The unvulcanized rubber composition was press-vulcanized at 160° C. for 15 minutes to provide a vulcanized rubber composition.

The vulcanized rubber composition was evaluated as described below. Tables 1 to 3 show the results. Comparative Examples 1, 7, and 9 are taken as reference comparative examples in Tables 1, 2, and 3, respectively.

<Fuel Economy>

The tan δ of each vulcanized rubber composition was measured with a spectrometer available from Ueshima Seisakusho Co., Ltd. at a dynamic strain amplitude of 1%, a frequency of 10 Hz, and a temperature of 50° C. The reciprocal of the tan δ is expressed as an index, with the value of the reference comparative example set equal to 100. A higher index indicates a smaller rolling resistance, which in turn indicates better fuel economy. The target index is 98 or higher.

<Abrasion Resistance>

The volume loss of each vulcanized rubber composition was measured with a laboratory abrasion and skid tester (LAT) under a load of 50 N at a rate of 20 km/h and a slip angle of 5°. The results are expressed as an index, with the value of the reference comparative example set equal to 100. A higher index indicates better abrasion resistance.

<Preparation of Ozone-Degraded Sample>

In conformity with JIS K 6259 "Rubber, vulcanized or thermoplastic—Determination of ozone resistance", a specimen of a predetermined size was prepared from each vulcanized rubber composition, and then subjected to a dynamic ozone degradation test to give an ozone-degraded sample. The test was carried out for 48 hours at a frequency of reciprocating motion of 0.5±0.025 Hz, an ozone concentration of 50±5 pphm, a test temperature of 40° C., and a tensile strain of 20±2%.

<Discoloration Resistance Evaluation>

The ozone-degraded sample was analyzed with a chroma meter (CR-310) available from Konica Minolta, Inc. to determine "a" and "b" values (L*a*b* color system). The value of $(a^2+b^2)^{-0.5}$ was used as a parameter and the results were expressed as an index calculated from the equation: (parameter of each formulation)/(parameter of reference comparative example)×100, wherein the value of the reference comparative example was set equal to 100. A higher index indicates less discoloration, which in turn indicates better discoloration resistance.

<Appearance Evaluation>

The appearance of the ozone-degraded sample was evaluated in an open air based on the following criteria.
AA: Darker black compared to reference comparative example and shiny
A: Darker black compared to reference comparative example and slightly shiny
B: Similar shade of brown as in reference comparative example
C: Darker brown compared to reference comparative example

TABLE 2

|  |  | Example | | Comparative Example | |
|---|---|---|---|---|---|
|  |  | 7 | 8 | 7 | 8 |
| Formulation (parts by mass) | SBR | 80 | 70 | 80 | 70 |
|  | NR | — | 10 | — | 10 |
|  | BR | 20 | 20 | 20 | 20 |
|  | Carbon black | 5 | 20 | 5 | 20 |
|  | Silica | 30 | — | 30 | — |
|  | Silane coupling agent | 3 | — | 3 | — |
|  | Wax | 2 | 2 | 2 | 2 |
|  | Oil | 4 | 2 | 5 | 3 |
|  | Surfactant 1 | 1.5 | — | — | — |
|  | Surfactant 2 | — | 1.5 | — | — |
|  | Antioxidant | 2.5 | 2.5 | 2.5 | 2.5 |
|  | Stearic acid | 3 | 3 | 3 | 3 |
|  | Sulfur | 1.5 | 1.5 | 1.5 | 1.5 |
|  | V200 | — | — | — | — |
|  | Zinc oxide | 4.5 | 4.5 | 4.5 | 4.5 |
|  | Vulcanization accelerator 1 | 2 | 2 | 2 | 2 |
|  | Vulcanization accelerator 2 | 1 | 1 | 1 | 1 |
| Evaluation results | Fuel economy | 101 | 99 | 100 | 98 |
|  | Abrasion resistance | 100 | 102 | 100 | 102 |
|  | Discoloration resistance | 103 | 104 | 100 | 98 |
|  | Appearance | A | A | C | B |

TABLE 1

|  |  | Example | | | | | | Comparative Example | | | | | |
|---|---|---|---|---|---|---|---|---|---|---|---|---|---|
|  |  | 1 | 2 | 3 | 4 | 5 | 6 | 1 | 2 | 3 | 4 | 5 | 6 |
| Formulation (parts by mass) | SBR | 70 | 70 | 70 | 40 | 70 | 70 | 70 | 70 | 70 | 70 | 70 | 20 |
|  | NR | — | — | — | 25 | — | — | — | — | — | — | — | 60 |
|  | BR | 30 | 30 | 30 | 35 | 30 | 30 | 30 | 30 | 30 | 30 | 30 | 20 |
|  | Carbon black | 5 | 5 | 40 | 5 | 5 | 40 | 5 | 5 | 5 | 5 | 5 | 40 |
|  | Silica | 80 | 80 | 45 | 80 | 80 | 45 | 80 | 80 | 80 | 80 | 80 | 45 |
|  | Silane coupling agent | 8 | 8 | 4 | 8 | 8 | 4 | 8 | 8 | 8 | 8 | 8 | 4 |
|  | Wax | 2 | 2 | 2 | 2 | 2 | 2 | 2 | 2 | 2 | 2 | 2 | 2 |
|  | Oil | 19 | 19 | 22 | 19 | 19 | 22 | 20 | 19 | 19 | 19 | 19 | 22 |
|  | Surfactant 1 | 1.5 | — | 1.5 | — | 1.5 | — | — | — | — | — | — | 1.5 |
|  | Surfactant 2 | — | 1.5 | — | 1.5 | — | 1.5 | — | — | — | — | — | — |
|  | Surfactant 3 | — | — | — | — | — | — | — | 1.5 | — | — | — | — |
|  | Surfactant 4 | — | — | — | — | — | — | — | — | 1.5 | — | — | — |
|  | Surfactant 5 | — | — | — | — | — | — | — | — | — | 1.5 | — | — |
|  | Surfactant 6 | — | — | — | — | — | — | — | — | — | — | 1.5 | — |
|  | Antioxidant | 2.5 | 2.5 | 2.5 | 2.5 | 2.5 | 2.5 | 2.5 | 2.5 | 2.5 | 2.5 | 2.5 | 2.5 |
|  | Stearic acid | 3 | 3 | 3 | 3 | 3 | 3 | 3 | 3 | 3 | 3 | 3 | 3 |
|  | Sulfur | 1.5 | 1.5 | 1.5 | 1.5 | 0.3 | 5 | 1.5 | 1.5 | 1.5 | 1.5 | 1.5 | 1.5 |
|  | V200 | — | — | — | — | 4 | — | — | — | — | — | — | — |
|  | Zinc oxide | 4.5 | 4.5 | 4.5 | 4.5 | 4.5 | 4.5 | 4.5 | 4.5 | 4.5 | 4.5 | 4.5 | 4.5 |
|  | Vulcanization accelerator 1 | 2 | 2 | 2 | 2 | 2 | 2 | 2 | 2 | 2 | 2 | 2 | 2 |
|  | Vulcanization accelerator 2 | 1 | 1 | 1 | 1 | 0.5 | 1 | 1 | 1 | 1 | 1 | 1 | 1 |
| Evaluation results | Fuel economy | 101 | 102 | 99 | 98 | 102 | 99 | 100 | 97 | 99 | 99 | 99 | 96 |
|  | Abrasion resistance | 101 | 101 | 100 | 106 | 102 | 101 | 100 | 99 | 97 | 97 | 99 | 97 |
|  | Discoloration resistance | 107 | 106 | 105 | 105 | 105 | 103 | 100 | 102 | 102 | 100 | 98 | 102 |
|  | Appearance | AA | A | A | A | A | A | B | B | A | B | B | A |

TABLE 3

|  |  | Example | | Comparative Example | |
|---|---|---|---|---|---|
|  |  | 9 | 10 | 9 | 10 |
| Formulation (parts by mass) | SBR | 55 | 50 | 55 | 50 |
|  | NR | — | 5 | — | 5 |
|  | BR | 45 | 45 | 45 | 45 |
|  | Carbon black | 5 | 5 | 5 | 5 |
|  | Silica | 115 | 130 | 115 | 130 |
|  | Silane coupling agent | 11 | 12 | 11 | 12 |
|  | Wax | 2 | 2 | 2 | 2 |
|  | Oil | 45 | 50 | 45 | 50 |
|  | Surfactant 1 | 1.5 | — | — | — |
|  | Surfactant 2 | — | 1.5 | — | — |
|  | Antioxidant | 2.5 | 2.5 | 2.5 | 2.5 |
|  | Stearic acid | 3 | 3 | 3 | 3 |
|  | Sulfur | 1.5 | 1.5 | 1.5 | 1.5 |
|  | V200 | — | — | — | — |
|  | Zinc oxide | 4.5 | 4.5 | 4.5 | 4.5 |
|  | Vulcanization accelerator 1 | 2 | 2 | 2 | 2 |
|  | Vulcanization accelerator 2 | 1 | 1 | 1 | 1 |
| Evaluation results | Fuel economy | 100 | 99 | 100 | 99 |
|  | Abrasion resistance | 101 | 100 | 100 | 97 |
|  | Discoloration resistance | 105 | 103 | 100 | 97 |
|  | Appearance | A | A | B | B |

The rubber compositions of Examples 1 to 10 exhibited improved discoloration resistance and improved tire appearance while maintaining or improving good fuel economy and good abrasion resistance.

The invention claimed is:

1. A rubber composition for tires, comprising:
a rubber component containing styrene-butadiene rubber in an amount of 30 to 100% by mass based on 100% by mass of the rubber component;
a nonionic surfactant represented by the formula (I) below; and sulfur,
the rubber composition for tires having a combined amount of carbon black and silica of 20 to 140 parts by mass relative to 100 parts by mass of the rubber component,
wherein the rubber composition for tires comprises 0.1 to 5.0 parts by mass of the nonionic surfactant relative to 100 parts by mass of the rubber component,

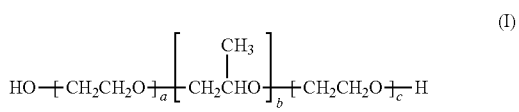

(I)

wherein a, b, and c represent integers, b is 20 to 40, and a+c is 10 to 48.

2. The rubber composition for tires according to claim 1, wherein the rubber composition for tires comprises 0.1 to 6.0 parts by mass of the sulfur relative to 100 parts by mass of the rubber component.

3. A tread formed from the rubber composition for tires according to claim 1.

4. A pneumatic tire, comprising a tire component formed from the rubber composition according to claim 1.

5. The pneumatic tire according to claim 4, wherein the tire component is a tread.

6. A pneumatic tire having a tread formed from the rubber composition according to claim 2.

* * * * *